United States Patent [19]

Moriki

[11] Patent Number: 4,752,493

[45] Date of Patent: Jun. 21, 1988

[54] PROCESS FOR PREPARING HOLLOW EXPANDED SNACKS

[75] Inventor: Koichi Moriki, Yokohama, Japan

[73] Assignee: Morinaga & Co., Ltd., Japan

[21] Appl. No.: 744,299

[22] Filed: Jun. 13, 1985

Related U.S. Application Data

[63] Continuation-in-part of Ser. No. 402,360, Jul. 27, 1982, abandoned.

[30] Foreign Application Priority Data

Jan. 27, 1981 [JP] Japan ................................. 56-10513

[51] Int. Cl.⁴ ............................................... A21D 8/02
[52] U.S. Cl. .................................... 426/559; 426/446
[58] Field of Search ..................... D1/106, 107, 111; 426/446, 448, 808, 559

[56] References Cited

U.S. PATENT DOCUMENTS

| 1,890,697 | 12/1932 | Scanlan | 426/559 |
|---|---|---|---|
| 2,162,376 | 6/1939 | Collatz | 426/74 |
| 3,652,294 | 3/1972 | Marotta et al. | 426/559 |
| 3,800,050 | 3/1974 | Popel | 426/808 |
| 3,925,567 | 12/1975 | Abe | 426/559 |

*Primary Examiner*—Raymond N. Jones
*Assistant Examiner*—Mary S. Mims

[57] ABSTRACT

Expanded snacks with a hollow space therein can be produced by preparing a farinaceous raw mixture by mixing one or more farinaceous materials of the type having small swelling capacity and one or more farinaceous materials of the type having large swelling capacity, gelatinizing so as to raise the temperature of said farinaceous raw mixture to 65°–90° C. while maintaining the temperature within the above range for 2–10 minutes, rolling the dough thus obtained into a sheet of a uniform thickness, cutting the resulting sheet into the desired shapes and then baking the thus formed dough pieces until they become fully expanded forming a hollow space within them.

10 Claims, 2 Drawing Sheets

PROCESS FOR PREPARING HOLLOW EXPANDED SNACKS

This application is a continuation-in-part of application Ser. No. 402,360 filed July 27, 1982, now abandoned.

BACKGROUND OF THE INVENTION (a) Field of the Invention

This invention relates to a process for preparing hollow expanded snacks which individually consist of a pair of thin, baked, farinaceous layers with a hollow space therebetween, give light crispy feeling to the eating, and especially have a figure three-dimensionally embodying the shape of an animal, a vehicle, or an object favorite for children.

(b) Description of the Prior Art

Foods, which are formed into the shape of an animal, a vehicle or the like, are suitable as snack foods since they look very joyful and give romantic or amusing visions. Thus, among foods produced by baking a farinaceous raw material such as cereal flour or the like, there are some foods which have shapes resembling animals or the like. Especially animal biscuits or crackers have found a wide-spread popularity among children.

Most of conventional animal-shaped baked foods represent the shapes of animals merely in plain. There are known rather few foods three-dimensionally resembling the shapes of animals or the like. Namely, as baked foods resembling the shapes of animals or the like. three-dimensionally, there have been known swan-shaped cream puff, animal-shaped bread and the like. These baked foods are hand-made artistic work and thus not suited for mass production.

"Onoroke-Mame" and the like have been known as baked foods having a baked farinaceous outer layer and a hollow space therein. For example, one of them is disclosed in U.S. Pat. No. 3,063,843 issued Nov. 13, 1962. These baked foods are prepared by coating core materials alternatingly with cereal flour such as glutinous rice flour and sugar syrup in a revolving pan to obtain a dough and, subsequent to drying same, roasting it while revolving same. Thus, they require lots of time and man power. They can be formed only into balls or the like. It is difficult to form them into complex shapes such as animals or the like.

Furthermore, animal biscuits or crackers, "Onoroke-Mame" and the like give heavy feeling to the eating. Consumers are recently moving towards foods having light feeling to the eating and those having heavy feeling to the eating have been losing their popularity.

SUMMARY OF THE INVENTION

The present inventor has made a research with a view toward developing hollow expanded snacks having figures of animals, vehicles or others. In the course of his research, one of the largest difficulties which he had to tide over was the fact that in any attempt to obtain a smooth thin sheet of uniform thickness by rolling a dough prepared from farinaceous raw materials he could never succeed in so doing. That is to say, it would be thought at first sight that when a dough is prepared from farinaceous raw materials, in any case whatever, a smooth thin sheet of a uniform thickness may be easily obtained by suitable rolling, but this is not truly the case as has already been widely known in the art concerned. Especially for the purpose of producing hollow expanded snacks of three-dimensional complex configuration as in this invention this was a serious problem because unless the dough is formed into a smooth thin sheet of a uniform thickness no hollow snack product of desired configuration can be obtained owing to the deformation or distortion resulting from the unevenness in the sheet material when baked. Nevertheless, in the prior art, wherein no such hollow expanded snacks as aimed at in this invention was produced, such a problem could be tolerated to some extent, and various expedients were adopted for meeting difficultines. For example, instead of forming into a sheet by a single step of rolling, dough is first formed into strands or rope-like products and then sliced into thin pieces, or very often the steps of drying, cooling, or aging, etc. are also added as necessary.

Generally speaking, when the dough prepared from farinaceous raw materials is formed into a sheet by rolling, no one can obtain a smooth thin sheet of a uniform thickness unless all the properties of the dough such as stickiness, elasticity, fluidity, rollability, etc. are well suited for the operation. Therefore, in order to accomplish the process of this inventionl, how to obtain a dough whose properties as above described are all well suited for sheeting was the key to succeed, and by the discovery of the key this invention could be accomplished.

The process of this invention is therefore based on the discovery of the following novel facts:

(1) In order to obtain a dough which can be formed into a smmoth thin sheet of a uniform thickness and moreover, whose expanding capacity is not small, it is essential that the dough is prepared from a farinaceous raw mixture obtained by mixing a major proportion of farinaceous material of the type having small swelling capacity and a minor proportion of farinaceous material of the type having large swelling capacity, and (2) The resulting farinaceous raw mixture should be partially, and not completely, gelatinixed.

The dough obtained in the above described way can thus be readily formed into a thin sheet of a desired uniform thickness of rolling. The sheet is then cut into desired shapes, in which case it is advantageous that even if scraps of dough are formed they can be immediately returned to the dough hopper for reuse. Since the dough pieces cut into desireded shapes are ready for baking, they can be baked immediately as they are without any additional step of drying, cooling, or aging, etc. so faras the partial gelatinization has been unmistakably performed. Upon baking, the starch in the surface of the dough pieces is first of all gelatinized, thereby forming a skin having good gas-holding capacity and showing excellent stretchability. As heating proceeds further, water and other volatile materials present in the dough pieces are gasified forming steam and other gases and vapors, which strongly push the skin outwardly, so that the dough pieces remarkably expand and are internally split into two layers or shells, upper and lower, forming a hollow space therebetween. When the dough pieces having the shapes of animals, vehicles or others are baked as above, they become baked products having round configurations as a result of expansion with the formation of a hollow space and thus they look as if they have been fleshed out, thereby producing hollow expanded snacks having the figures of animals, vehicles or others, respectively.

According to the process of this invention, there is therefore, provided a process for preparing hollow expanded snacks having the figures of animals, vehicles or others, which process comprises the step of preparing a farinaceous raw mixture by mixing 60–95 parts by weight of one or more farinaceous materials of the type having small swelling capacity and 40–5 parts by weight of one or more farinaceous materials of the type having large swelling capacity, the step of gelatinizing a part of said farinaceous raw mixture either by adding hot water to said farinaceous raw mixture or by subjecting said farinaceous raw mixture beforehand added with water to the action of steam so as to raise the temperature of said farinaceous raw mixture to 65°–90° C. while maintaining the temperature within this range for 2–10 minutes, the step of rolling the dough thus obtained into a sheet of a uniform thickness in the range of 0.8–3 mm, the step of cutting the resulting sheet into the desired shapes adapted for the figures of animals, vehicles or others, and the step of baking the thus formed dough pieces until they become fully expanded forming a hollow space within them.

The above and other features and advantages of this invention will become apparent from the following description and the appended claims, taken in conjunction with the accompanying drawings.

BRIEF DESCRIPTION OF THE INVENTION

DETAILED DESCRIPTION OF THE INVENTION AND PREFERRED EMBODIMENTS

Figure 1:
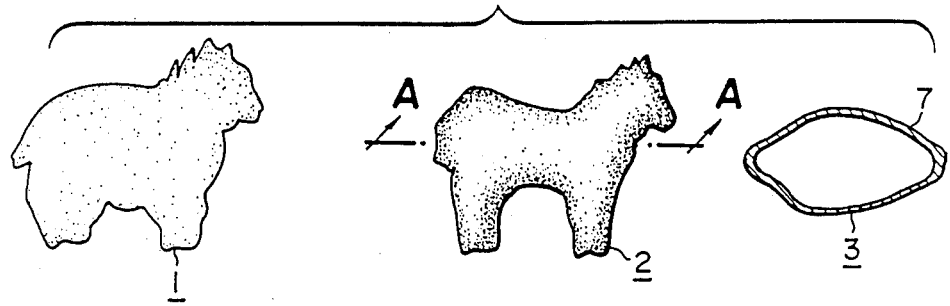
FIG. 1 shows a dough piece formed into the shape of a horse and a hollow expanded, horse-shaped snack along with a cross-sectional view of the hollow expanded, horse-shaped snack taken along line A—A.

When rolling a conventional dough made of a farinaceous raw material into a sheet, it is difficult to obtain a thin sheet of a uniform thickness with smooth surface because the sheeting capacity (i.e., stickiness, elasticity, fluidity, rollability, etc.) of the dough is not suited for the purpose as earier described. For instance, use of a dough made of potato starch which has been gelatinized encounters difficulties upon rolling the dough into a thin sheet since the dough has strong elasticity but small fluidity. Even if such a conventional dough can be formed into a thin sheet, the resultant sheet contains fine depressions and projections in its surfaces and its thickness is not uniform. Especially when the sheet contains scraps of dough, such a phenomenon is remarkable. When a sheet having such depressions and projections in its surfaces is baked, it does not expand uniformly and results in a rugged, baked product because the holding capacity of the gases to be generated, the initiation time of expansion, the expanding speed, the extent of expansion and the like are different from one location to another. Moreover, it provides no hollow expanded snacks and, in some instances, results in deformed, bent, and/or cracked snacks.

On the other hand, a dough obtained by gelatinizing a farinaceous raw material of the type having small swelling capacity, for example, such as wheat flour may be formed into a thin sheet of a uniform thickness. However, its expanding capacity is too small to produce any substantially hollow expanded, baked product.

This invention makes very ingenious use of the above-mentioned characteristic features of the farinaceous raw materials of both types. Namely, when a dough made of 60–95 parts by weight of one or more farinaceous materials of the type having small swelling capacity and 40–5 parts by weight of one or more farinaceous materials of the type having large swelling capacity is partially gelatinized, it becomes suitable for rolling into a thin smooth sheet of a uniform thickness, and therefore, after cutting into desired shapes such as those of animals, vehicles, or others, the thus-formed sheet is readily baked into substantially hollow expanded snacks which are aimed at in this invention.

The term "farinaceous raw material of the type having small swelling capacity" as used herein means a farinaceous raw material formed of starch which does not swell too much when mixed with water and heated. As such a farinaceous raw material of the type having small swelling capacity may be mentioned nonglutinous cereals or the like such as wheat, rye, maize, nonglutinous rice, sago, sorghum, triticale, millet and beans or the starches separated from these sources. On the other hand, by the term "farinaceous raw material of the type having large swelling capacity" as used herein is meant a farinaceous raw material formed of starch which swells very well when mixed with water and then heated. As such a farinaceous raw material of the type having large swelling capacity may be mentioned potato, taro, tapioca, arrowroot, sweet potato, glutinous rice, waxy corn, and the like or the starches derived from these sources. But if the cell walls of these starches are not broken, they cannot be used as the raw material of the type having large swelling capacity.

The term "the shapes of animals or the like" and similar terms related thereto as used herein are not limited to the shapes of those named, but embrace any of the shapes which can be given to the hollow expanded snacks of this invention. It should also be understood to include any nonrepresentational shapes.

For the practice of the process of this invention, hot water or steam is utilized to partially gelatinize 100 parts by weight of a farinaceous raw mixture obtained by mixing 60–95 parts by weight of one or more farinaceous materials of the type having small swelling capacity and 40–5 parts by weight of one or more farinaceous raw materials of the type having large swelling capacity. When hot water is added to the farinaceous raw mixture so as to gelatinize a part of its starch, it is preferable to add 50-150 parts by weight of hot water of 80° C. or higher, or more preferably, 90° C. or higher to 100 parts by weight of the farinaceous raw mixture and maintain the temperature of the resulting moistened farinaceous raw mixture within the range of 65°-90° C. for 2-10 minutes while mixing and kneading said mixture. On the other hand, when steam is applied to the farinaceous raw mixture so as to gelatinize a part of its starch, it is preferable that 30-100 parts by weight of water is beforehand added to 100 parts by weight of the farinaceous raw mixture and then steam is gradually applied thereto in an open air until the amount of condensed water reaches 10-30 parts by weight while mixing and kneading the thus moistened farinaceous raw mixture, thereby maintaining the temperature of said mixture within the range of 60°-90° C. for 2-10 minutes.

Heat may be applied, if needed, to the farinaceous raw mixture to increase its temperature when mixing the farinaceous raw material of the type having small swelling capacity and the farinaceous raw material of the type having large swelling capacity.

By mixing and treating the farinaceous raw materials in the aforementioned manner, there is prepared a dough in which a part of the farinaceous raw mixture has been gelatinized but the remainder has not been gelatinized. The thus-prepared dough is quite suitable to form a thin sheet of a uniform thickness owing to its excellent sheeting capacity especially such as a small degree of elasticity, low stickiness, etc. If the rate of gelatinization of the farinaceous raw mixture should become too high and the stickiness of the dough should become excessive, a farinaceous raw material of the type having small swelling capacity may be added, while if the rate of gelatinization of the farinaceous raw mixture should become too low a gelatinized farinaceous raw material of the type having large swelling capacity may be added, thereby, in both cases, contributing to adjust the overall rate of gelatinization of the dough and obtain a desired degree of sheeting capacity.

In order to impart characteristic flavor and/or taste or desired color to final products, it is possible to add either before or after gelatinizing a part of the farinaceous raw mixture a taste-imparting ingredient, flavoring ingredient, and/or coloring agent such as sweetening, salt, "miso" (salty fermented soybean paste), soy sauce, monosodium glutamate, oil, fat, coffee, cocoa, dairy producs, nut paste, etc., provided that none of them should remain in the form of large particles in the sheet. Here, it is desirous to limit the total amount of such additives below 50 parts by weight per 100 parts by weight of the farinaceous raw mixture.

The thus-prepared dough can be rolled and made thinner, resulting in a sheet of a uniform thickness without any local irregularity in thickness and any depressions and projections in surface.

The above dough can be easily cut by means of a sharp edge, so that it is cut into the desired shapes of animals or the like, and then baked. Upon baking, the dough pieces are expanded into hollow expanded products which present the three-dimensional figures of animals or the like.

Unless the dough sheet has a uniform thickness, it cannot expand uniformly as a whole upon baking, so that the baked products all become rugged bodies having unsightly shapes far from the original familiar shapes of animals or the like.

If the thickness of the dough sheet is excessively thin, the dough sheet shows poor gas-holding capacity upon baking, probably, due to the partial release of the gases being developed, so that it is not possible within the dough to build up a gas pressure sufficient to push its skin outwardly. Thus, it is difficult to obtain a satisfactorily-expanded, hollow snack under such circumstances. On the other hand, if the dough sheet is too thick, its water cannot freely evaporate upon baking. As a result, this especially causes bent or cracked snacks to be produced, presumably, under the influence of the difference in the drying speed between its upper layer and lower layer. Accordingly, it is desirous to make the thickness of the dough sheet to be in the range of 0.8-3 mm as measured prior to baking.

When a dough sheet is cut into, for example, a circular shape, a ball-shaped hollow expanded snack will be obtained through its baking. When a dough sheet is formed into the profile of an animal or a car as shown at numeral 1, 1', or 1" in each of the accompanying drawings, there will be obtained an expanded product corresponding to the shape of the individual sheet as shown at numeral 2 (or 2', 2") in each of the drawings, and it is a hollow expanded snack having the figure three-dimensionally embodying an animal or the like. Or it is basically a hollowed body having a thin outer shell consisting of a baked farinaceous mixture as shown at, for example, numeral 3 in FIGS. 1 and 2, so that it gives light crispy feeling to the eating.

Figure 4:
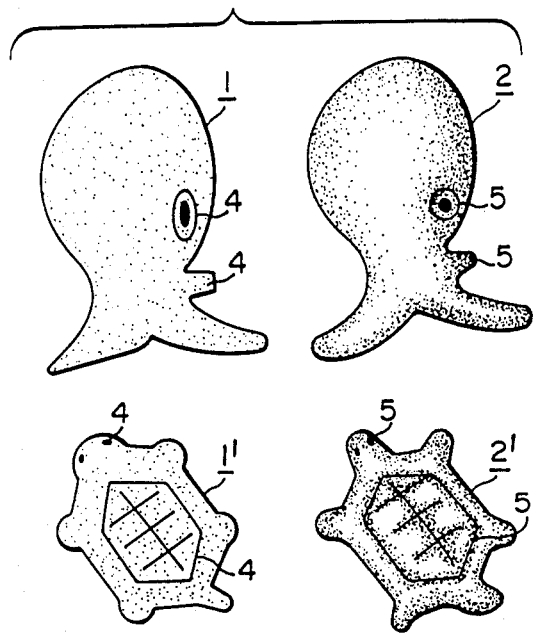
FIG. 4 illustrates dough pieces formed respectively into octopus and turtle or tortoise (hereinafter simply referred to as "turtle") and bearing patterns drawn thereon as well as their corresponding hollow expanded snacks.
Figure 6:
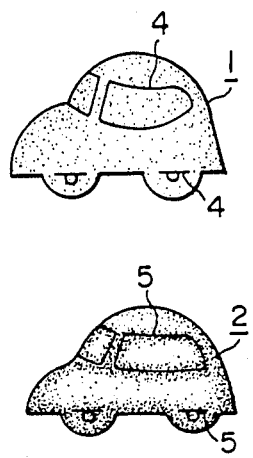
FIG. 6 shows a dough piece formed into the shape of a car and bearing some patterns drawn thereon as well as a hollow expanded, car-shaped snack resulted from said dough piece.

Further more, by drawing a pattern 4 on the upper surface of an unbaked sheet with an edible colorant such as chocolate, food color or the like as shown at numeral 1 (or 1') in FIG. 4 or FIG. 6 for instance, a pattern 5 well matched the profile of the snack can be provided on the surface of a baked, hollow expanded snack as indicated at numeral 2 (or 2').

Baking is preferably carried out at 150°-250° C. since at a temperature below the above lower limit it takes too much time for achieving the expansion and involves a danger of the surfaces of the sheet being excessively dried before the expansion, whereas at a temperature over the above upper limit it has a danger of the snacks being scorched. The baking may be carried out using an oven, roaster or the like.

The thus-baked hollow expanded snacks may be served as they are. But, they may also be imparted favorite taste and/or flavor by applying on their outer surfaces oil, fat, sugar, salt, soy sauce, monosodium glutamate, powdered cocoa, chocolate, cream, powdered vegetables, kelp meal, spices or the like as a taste and/or flavor-imparting ingredient. It is also possible to inject such a taste and/or flavor-imparting ingredient into the hollow expanded snacks.

The present invention will hereinafter be described in further detail in the following examples. It is noted that the word "part(s)" used herein designates "part(s) by weight" unless otherwise specified.

EXAMPLE 1

Into a mixer heated to about 70° C., 70 parts of wheat flour, 30 parts of potato starch, 15 parts of sugar and 1 part of salt were charged and mixed there. When the temperature of the resulting mixture reached about 55° C., 80 parts of hot water of 98° C. were added further, followed by mixing and kneading the resultant moistened mixture for 3 minutes to gelatinize a part of its starch. After the mixing and kneading for 3 minutes, the temperature of the mixture was about 70° C.

Then, the mixer was cooled and 10 parts of butter, 1 part of a fatty acid monoglyceride and a suitable amount of butter flavor were added. The resulting mixture was allowed to cool down to 65° C. or below, thereby obtaining a dough.

The above dough was then rolled with rollers into a sheet of thickness of 1 mm. This sheet was substantially free of ruggedness and had a uniform thickness.

The above sheet was then cut into a shape as shown in FIG. 1. It was then baked initially at around 220° C. and the baking temperature was gradually lowered down to 150° C., thereby obtaining a expanded snack three-dimensionally resembling the shape of a horse such as shown at numeral 2 in FIG. 1. As shown at numeral 3 in FIG. 1, the expanded snack had a hollow space and, when eaten, gave light crispy feeling to the eating.

The above procedure was repeated except that the thickness of the sheet was decreased to 0.5 mm. About 10% of the resultant baked products did not expand. The remaining expanded products did not show any sufficient degree of expansion, failing to present profiles three-dimensionally resembling the shape of the horse.

When the thickness of the sheet was increased to 4 mm, about 10% of the baked products developed cracks. The remaining 90% of the baked products, which were free of cracks, were bent or otherwise deformed, failing to develop any satisfactory horse-shape.

EXAMPLE 2

Charged into a mixer were 50 parts of corn starch, 40 parts of wheat flour, 10 parts of glutinous rice, 50 parts of water and 1.5 parts of salt. They were mixed intimately and then allowed to stand for a while.

They were then mixed and kneaded for about 10 minutes into a dough while injecting steam in an open air.

Owing to the injection of the steam, the mixture was heated to 65° C. or higher in 6-7 seconds and to about 75° C. in 10 minutes. The water content in the dough was increased by 20 parts owing to the injection of the steam.

Then, the dough was rolled by means of rollers into a sheet of a thickness of 2 mm. It was then shaped into such a profile as shown at numeral 1 in FIG. 2. Upon baking, there was obtained a baked product having a hen-like profile as depicted at numeral 2 in FIG. 2. Oil was sprayed onto the outer surface of the baked product and powdered seasoning stuff was applied thereonto, resulting in a expanded snack.

Figure 2:
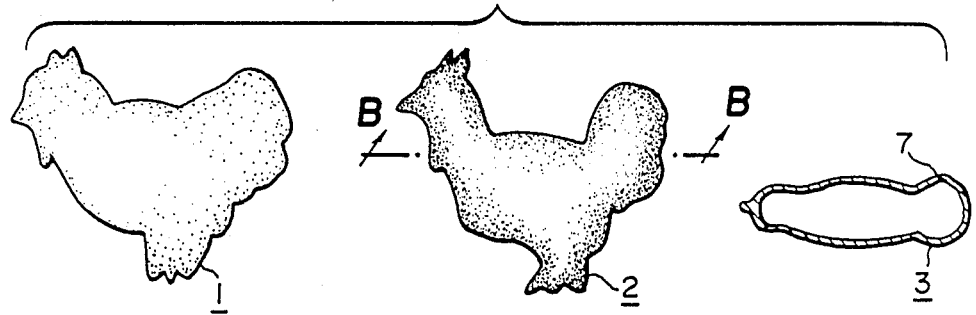
FIG. 2 illustrates a dough piece formed into the shape of a hen or rooster (hereinafter simply referred to as "hen") and a hollow expanded, hen-shaped snack along with a cross-sectional view of the hollow expanded, hen-shaped snack taken along line B—B.

The expanded snack was, as shown at numeral 3 in FIG. 2, made of a thin shell of a baked farinaceous mixture with a hollow space therein and give light, crispy feeling to the eating.

EXAMPLE 3

After mixing 60 parts of wheat starch, 35 parts of oxidized tapioca starch, 5 parts of gelatinized waxy corn starch and 1 part of salt, 100 parts of hot water of 98° C. were added further. Then, the resulting mixture was mixed and kneaded for 3 minutes. Here, the temperature of the mixture was about 68° C. Then, 15 parts of shortening were incorporated and kneaded into a dough. At this time, temperature of the dough was 65° C. or lower.

Figure 3:
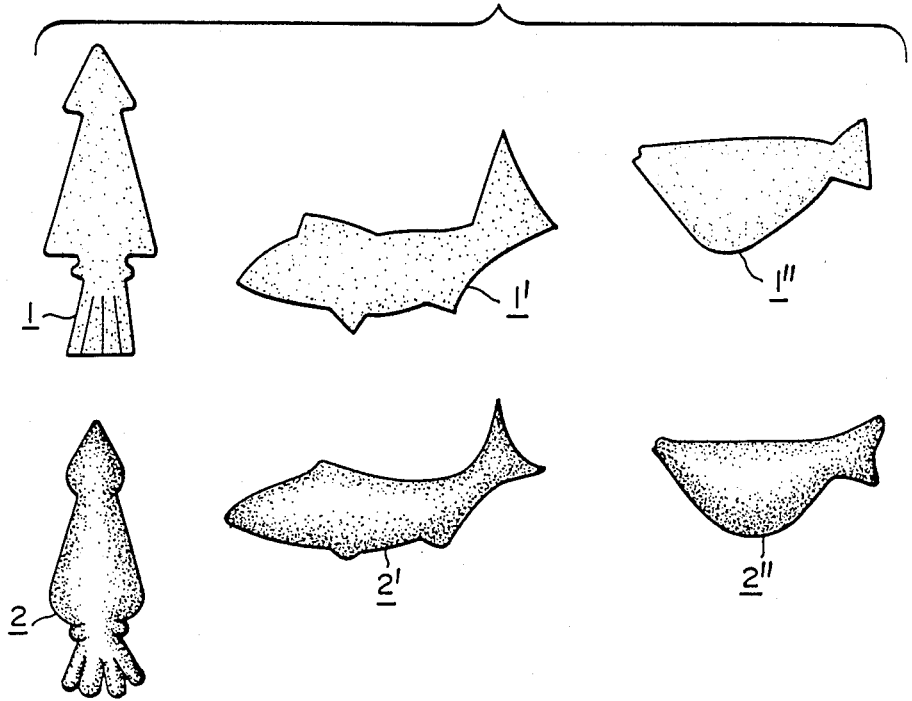
FIG. 3 depicts dough pieces formed respectively into squid or cuttle fish (hereinafter simply referred to as "squid"), bonito and globefish as well as their corresponding hollow expanded products.

Then the dough was formed into a sheet of a thickness of 2.5 mm and cut into such shapes as shown at numerals 1, 1', 1" in FIG. 3. Upon baking, there were obtained snacks having the shapes of marine organisms such as squid, bonito, globefish or the like shown at 2, 2', 2" in FIG. 3. Oil was sprayed onto the outer surfaces of the snacks and a powdered seasoning ingredient was applied thereonto, thereby giving hollow expanded snacks.

EXAMPLE 4

Into a mixer which has beforehand been heated to about 60° C., were charged 40 parts of corn starch, 30 parts of wheat flour, 20 parts of potato flour, 10 parts of waxy corn starch and 2 parts of salt. They were then mixed togther. When the mixture reached about 40° C., 120 parts of hot water of 98° C. were added, fllowed by mixing and kneading for 3 minutes. Here, the mixture had a temperature of 72° C. Then, 20 parts of wheat flour, 10 parts of shortening and 5 parts of suger were added and the resulting mixture was kneaded. Upon cooling the kneaded mixture to 65° C. or below, a dough was obtained.

The above dough was formed into a sheet of a thickness of 1.5 mm and shaped into such profiles as shown at numerals 1, 1' in FIG. 4. A pattern 4 such as eyes, mouth, and turtle carapace or tortoise shell was drawn with an edible colorant. They were then baked, obtaining hollow expanded snacks having the shapes of octopus and turtle with a pattern 5 as shown at numerals 2, 2' in FIG. 4.

Example 5

Ninety parts of wheat flour, 10 parts of sweet potato starch, and 1.5 parts of salt were mixed in a mixer which had been heated to 70° C. When the mixture reached about 50° C., 100 parts of hot water of 98° C., were added, followed by mixing and kneading the entire mixture for 3 minutes. At this stage, the temperature of the mixture was 75° C. Then, 10 parts of gelatinized potato starch and 15 parts of shortening were added and kneaded. Upon cooling the resultant mass to 65° C. or below, a dough was obtained.

Figure 5:
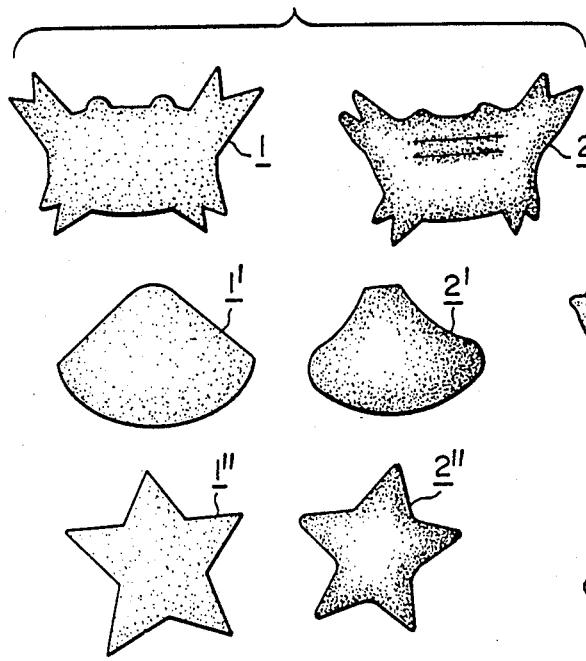
FIG. 5 depicts dough pieces formed respectively into crab, shell-fish and starfish as well as their corresponding hollow expanded snacks.

The above dough was formed into a sheet of a thickness of 1.7 mm and shaped into such profiles as depicted at numerals 1, 1', 1" in FIG. 5. After baking, mixed hollow expanded snacks of small seashore organisms such as crab, shellfish and starfish were obtained as shown at numerals 2, 2', 2" in FIG. 5.

EXAMPLE 6

Seventy parts of corn starch, 20 parts of potato starch, 10 parts of rye flour, 60 parts of water and 2 parts of salt were mixed and allowed to stand for a while. Then, it was mixed and kneaded for about 10 minutes while injecting steam thereinto. The mixture was heated to 65° C. or higher in 7 minutes after the initiation of the mixing and kneading and to 73° C. after the lapse of 10 minutes from the initiation of the mixing and kneading. The water content was increased by 20 parts owing to the injection of the steam.

Thereafter, 20 parts of shortening and 20 parts of wheat flour were added and kneaded to obtain a dough.

The above dough was formed into a sheet of thickness of 1.5 mm and cut into a shape as shown at numeral 1 in FIG. 6. A pattern 4 such as windows and tires was drawn with an edible colorant and, upon baking, there was obtained a hollow expanded snack having a car-like shape with a pattern 5 as shown at numeral 2 in FIG. 6.

EXAMPLE 7

Ninety parts of corn grits, 5 parts of potato granules, 5 parts of waxy corn starch, 50 parts of water and 1.5 parts of salt were mixed and then allowed to stand for a while to make its texture more uniform. It was then kneaded for 15 minutes while injecting steam thereinto, leading to a dough. The temperature of the dough reached 65° C. or higher in 10 minutes after the initiation of the kneading and 78° C. upon lapse of 15 minutes after the initiation of the kneading. Owing to the injection of the steam, the water content in the dough increased by 30 parts.

Figure 7:
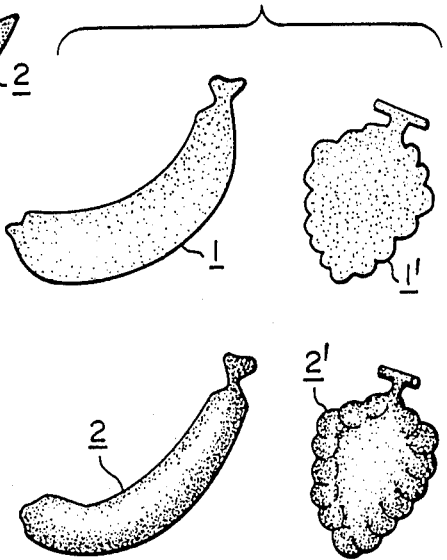
FIG. 7 illustrates dough pieces formed respectively into banana and grapes as well as their corresponding hollow expanded snacks.

The above dough was formed into a sheet of a thickness of 1.3 mm and, after forming it into such shapes as depicted at numerals 1, 1' in FIG. 7, they were baked to give hollow expanded snacks having banana-like and grape-like shapes as shown at numerals 2, 2' in FIG. 7.

Having now fully described the invention, it will be apparent to one skilled in the art that many changes and modifications can be made thereto without departing from the spirit or scope of the invention as set forth herein.

I claim:

1. A process for preparing hollow expanded snacks having on an industrial scale which process comprises: the step of preparing a farinaceous raw mixture by mixing 60–95 parts by weight of farinaceous materials of the type having small swelling capacity, and 40–5 parts by weight of farinaceous materials of the type having large swelling capacity to provide a farinaceous raw mixture of 100 parts by weight, the step of gelatinizing a part of said farinaceous raw mixture by adding 50–100 parts by weight of hot water to said farinaceous raw mixture to raise the temperature of said farinaceous raw mixture to 65°–90° C. the step of maintaining the temperature of the mixture within the above range for 2–10 minutes, the step of stirring the mixture while maintaining said temperature, the step of rolling the dough thus obtained into a sheet of a uniform thickness in the range of 0.8–3 mm, the step of cutting the resulting sheet into the desired shapes, and the step of baking the thus formed dough pieces until they become fully expanded forming a hollow space within them.

2. The process according to claim 1 wherein the farinaceous materials of the type having small swelling capacity is selected from the group consisting of wheat, rye, maize, nonglutinous rice, sorghum, triticale, millet, beans or a starch separated from one of these materials.

3. The process according to claim 1 wherein the farinaceous materials of the type having large swelling capacity is selected from the group consisting of potato, taro, tapioca, arrowroot, glutinous rice, waxy corn, or starches derived from these materials.

4. The process according to claim 1 wherein the step of gelatinizing a part of a farinaceous raw mixture is performed by adding 50–150 parts by weight of hot water of 80° C. or higher to 100 parts by weight of said farinaceous mixture.

5. The process according to claim 2 wherein the step of gelatinizing a part of a farinaceous raw mixture is performed by adding 50–150 parts by weight of hot water of 80° C. or higher, to 100 parts by weight of said farinaceous mixture.

6. The process according to claim 3 wherein the step of gelatinizing a part of a farinaceous raw mixture is performed by adding 50–150 parts by weight of hot water of 80° C. or higher, to 100 parts by weight of said farinaceous mixture.

7. The process according to claim 1 wherein the step of gelatinizing a part of a farinaceous raw mixture is performed by first adding 30–100 parts by weight of water to 100 parts by weight of said farinaceous raw mixture and then steam is gradually applied thereto until the amount of condensed water reaches 10–30 parts by weight.

8. The process according to claim 2 wherein the step of gelatinizing a part of a farinaceous raw mixture is performed by first adding 30–100 parts by weight of water to 100 parts by weight of said farinaceous raw mixture and then steam is gradually applied thereto until the amount of condensed water reaches 10–30 parts by weight.

9. The process according to claim 3 wherein the step of gelatinizing a part of a farinaceous raw mixture is performed by first adding 30–100 parts by weight of water to 100 parts by weight of said farinaceous raw mixture and then steam is gradually applied thereto until the amount of condensed water reaches 10–30 parts by weight.

10. In a process for preparing hollow expanded snacks by mixing and kneading farinaceous materials with water to give a dough and forming and obtained dough into definite shapes followed by baking to thereby continuously prepare expanded snacks in an industrial scale, the improvement comprising; adding 30–100 parts by weight of water to 100 parts by weight of farinaceous materials, which comprises 60–95 parts by weight of farinaceous materials having small swelling capacity and 40–5 parts by weight of farinaceous materials having large swelling capacity, and steaming the obtained mixture for 2–10 minutes at 65°–90° C. under stirring by applying steam in such an amount as to finally give 10–30 parts by weight of condensed water thereto to thereby give a partially, and not completely, gelatinized dough; forming the obtained dough into a sheet having a uniform thickness in the range of 0.8–3.8 mm and baking said pieces for a period of time whereby the product expands thereby producing hollow expanded snacks of desired configuration.

* * * * *